United States Patent [19]

Boisset

[11] 4,387,874
[45] Jun. 14, 1983

[54] ADJUSTABLE VEHICLE SEATS AND THEIR ADJUSTMENT MECHANISMS

[75] Inventor: Bernard Boisset, Etampes, France

[73] Assignee: Societe Industrielle Bertrand Faure, Etampes, France

[21] Appl. No.: 204,698

[22] Filed: Nov. 6, 1980

[30] Foreign Application Priority Data

Nov. 14, 1979 [FR] France .............................. 79 28119

[51] Int. Cl.³ .......................... A47D 19/04; B60N 1/06
[52] U.S. Cl. .................................... 248/396; 248/371; 297/339
[58] Field of Search ............... 248/396, 394, 395, 397, 248/398, 371; 297/339, 338, 311

[56] References Cited

U.S. PATENT DOCUMENTS

| 1,065,280 | 6/1913 | Stanger et al. | 288/396 X |
| 2,057,591 | 10/1936 | Rast | 248/395 |
| 2,132,009 | 10/1938 | Ball | 248/394 |
| 2,850,081 | 9/1958 | Dillon | 248/397 |
| 4,304,384 | 12/1981 | Cremer | 248/397 |

FOREIGN PATENT DOCUMENTS

| 29377 | 5/1981 | European Pat. Off. | 248/396 |
| 2006816 | 6/1979 | Fed. Rep. of Germany | 248/396 |
| 2604620 | 9/1977 | France | 248/396 |
| 7927263 | 11/1979 | France . | |
| 1441633 | 7/1976 | United Kingdom | 248/396 |

Primary Examiner—James T. McCall
Attorney, Agent, or Firm—Cushman, Darby & Cushman

[57] ABSTRACT

A vehicle seat equipped with at least one mechanism for adjusting the height of the front or of the rear of the sitting portion or the tilt of the seat back.

The control lever of this mechanism is brought forward to the front of the seat and its rotations are transmitted by a chain and toothed-wheel system to a bar equipped at both ends with rollers having two pins adapted to coact respectively with horizontal apertures in the sitting portion and with vertical sets of teeth in the base.

The preferred application of the invention is to seats mounted so that no space is available laterally for the usual control members of the adjustment mechanisms.

10 Claims, 5 Drawing Figures

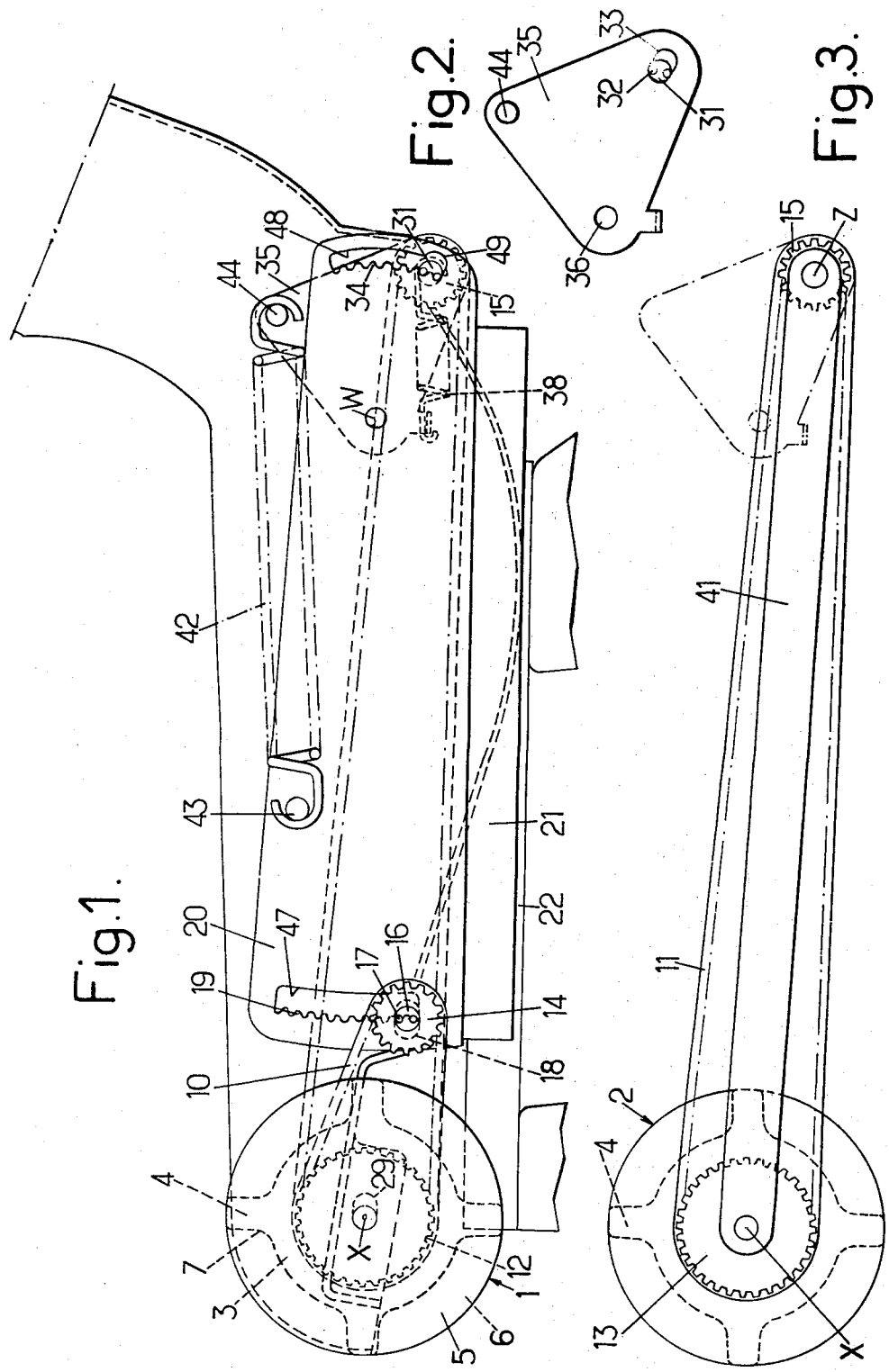

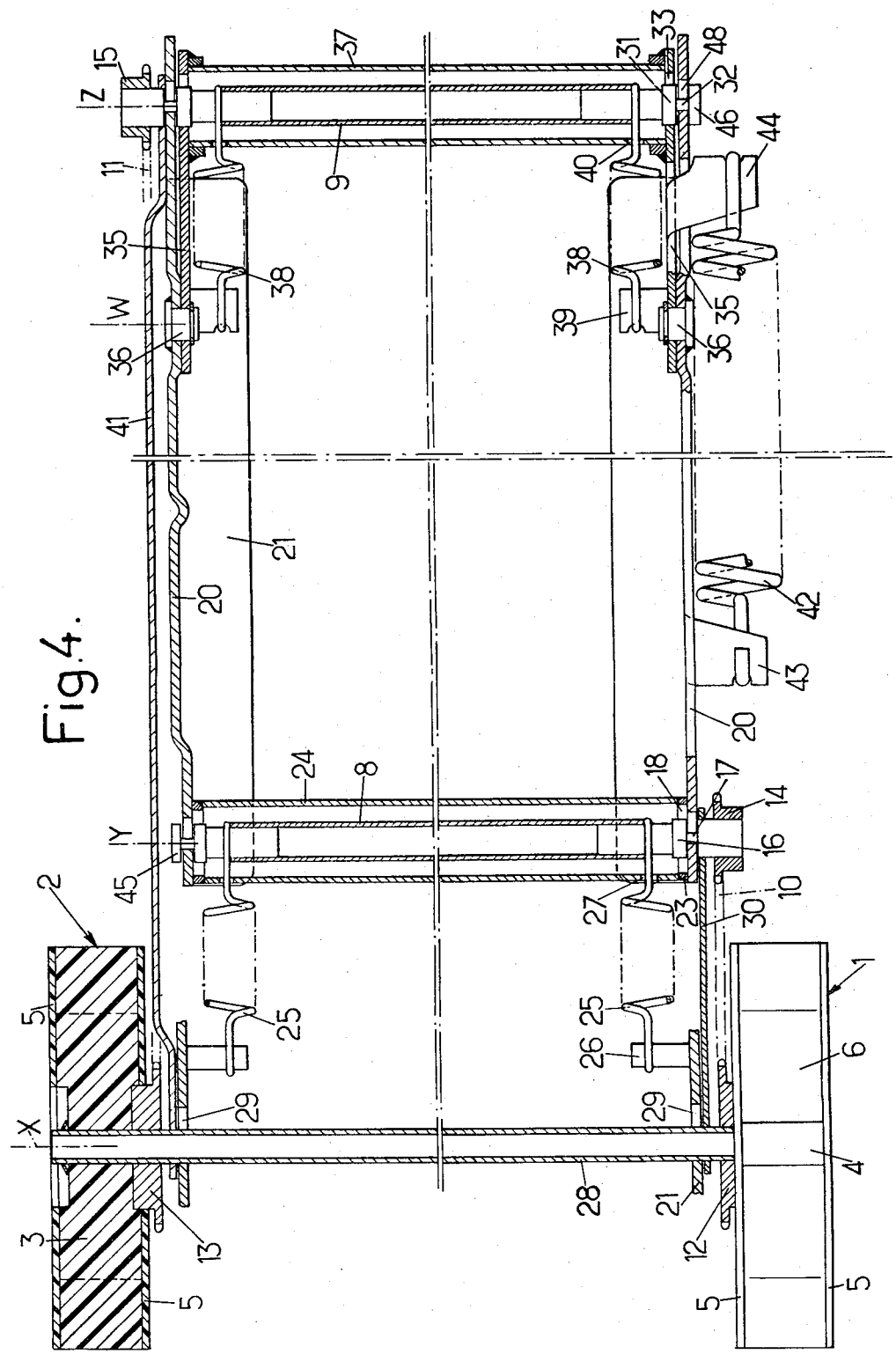

ADJUSTABLE VEHICLE SEATS AND THEIR ADJUSTMENT MECHANISMS

The invention relates to vehicle seats comprising a sitting portion, a seat back and a mechanism adapted to adjust at least one of the parameters on which the comfort of the user of the seat depends, such as the following: height of the front, of the rear or of the whole of the seat, tilt of this unit, tilt of the seat back with respect to the sitting portion, stiffness of the lumbar support, and this from rotation of a control member with transverse axis.

It also relates to adjustment mechanisms of the kind in question fitted to said seats.

Application of the present invention seems to offer the most interest to adjustable seats for vehicles in which the space customarily available laterally of back where rotary control members are usually located on such vehicle seats is substantially smaller than usual. This is the case for some seats of the "bucket" type designed so as to resist transverse crushing and intended to be housed substantially jointingly in troughs forming part of the resistant framework of the vehicle, seats such as those described in the present inventor's copending U.S. patent application Ser. No. 202,000, filed Oct. 28, 1980. However, the seats of the present invention are not restricted to use in such a context.

The invention consists principally in arranging one at least of the adjustment mechanisms of the kind in question so that its rotary control member is brought forward to the front end at one side of the seat, including its axis of rotation.

In the preferred embodiments recourse is had furthermore to one and/or the other of the following arrangements:

the control member of the adjustment mechanism considered is a "pancake"-shaped part with transverse axis from which project radial lugs, these lugs being advantageously all disposed between two lateral discs forming therewith the edges of sockets for receiving the fingers of the user, the lugs according to the preceding paragraph are four in number, staggered angularly by 90 degrees about the axis of the "pancake", the adjustment mechanism considered uses the rotations of a rigid bar extending over the whole width of the seat, these rotations being controlled from the control member by means of a chain or belt cooperating with two toothed wheels rigidly locked angularly respectively to this control member and to this bar, in an adjustment mechanism according to the preceding paragraph, the bar is rigidly secured, at both its ends, to a roller cylindrical in revolution having two parallel eccentric pins adapted to coact with a set of teeth provided on the fixed base of the seat and extending along a substantially vertical arc of a circle, said roller being jointly housed in an elongated aperture horizontally connected to the framework of the sitting portion, resilient means being associated with the bar so as to constantly urge the pins to the bottom of notches in the corresponding sets of teeth, and a rigid link being provided for maintaining constant the spacing between the axes of the control member and of the bar while still allowing them slight horizontal movements required for permitting the alternate movements of the pins out of their notches against the return force of the resilient means, in a seat fitted with two mechanisms in accordance with the preceding paragraph for respectively adjusting the height of the front and that of the rear of the seat, each of the two horizontally elongated apertures which receive respectively the two rollers, of one of the two mechanisms, provided respectively on both sides of the seat, is cut out in a rocking lever piovtably mounted about a transverse axis fixed to the base of the seat, said axis being situated preferably at the level of the set of teeth corresponding to the roller considered, this set of teeth being centred on said axis, in a seat according to the preceding paragraph, in which the rocking levers are associated with the mechanism for adjusting the rear height, resilient means are provided for permanently angularly urging the rocking levers in the direction corresponding to raising of the rear of the seat, these means being advantageously formed by a strong helical tension spring stretched, in a substantially horizontal direction, between a point on the base of the seat and a high point on one of the two rocking levers, in a seat according to at least the paragraph which precedes the preceding one, the two rocking levers are formed by plates joined together by a transverse rigid tube whose ends are fixed on these rocking levers, in a seat according to the preceding paragraph, the rigid tube has passing therethrough the rigid bar connecting together the two rollers of the rear mechanism.

The invention comprises, apart from these principal arrangements, certain other arrangements which are used preferably at the same time and which will be more explicitly discussed hereafter.

In what follows, there will be described a preferred embodiment of the invention with reference to the accompanying drawings in a way which is of course in no wise limiting.

FIG. 1 of these drawings shows laterally the base of a vehicle seat fitted with two adjusting mechanisms in accordance with the invention.

FIGS. 2 and 3 show, in the same lateral direction as FIG. 1, two pieces of one of these mechanisms, these pieces being respectively not or very little visible in FIG. 1.

FIG. 4 shows in a top view, on a larger scale, with a certain number of portions in section, the same seat base or more precisely the four corners of this base.

Figure 5:
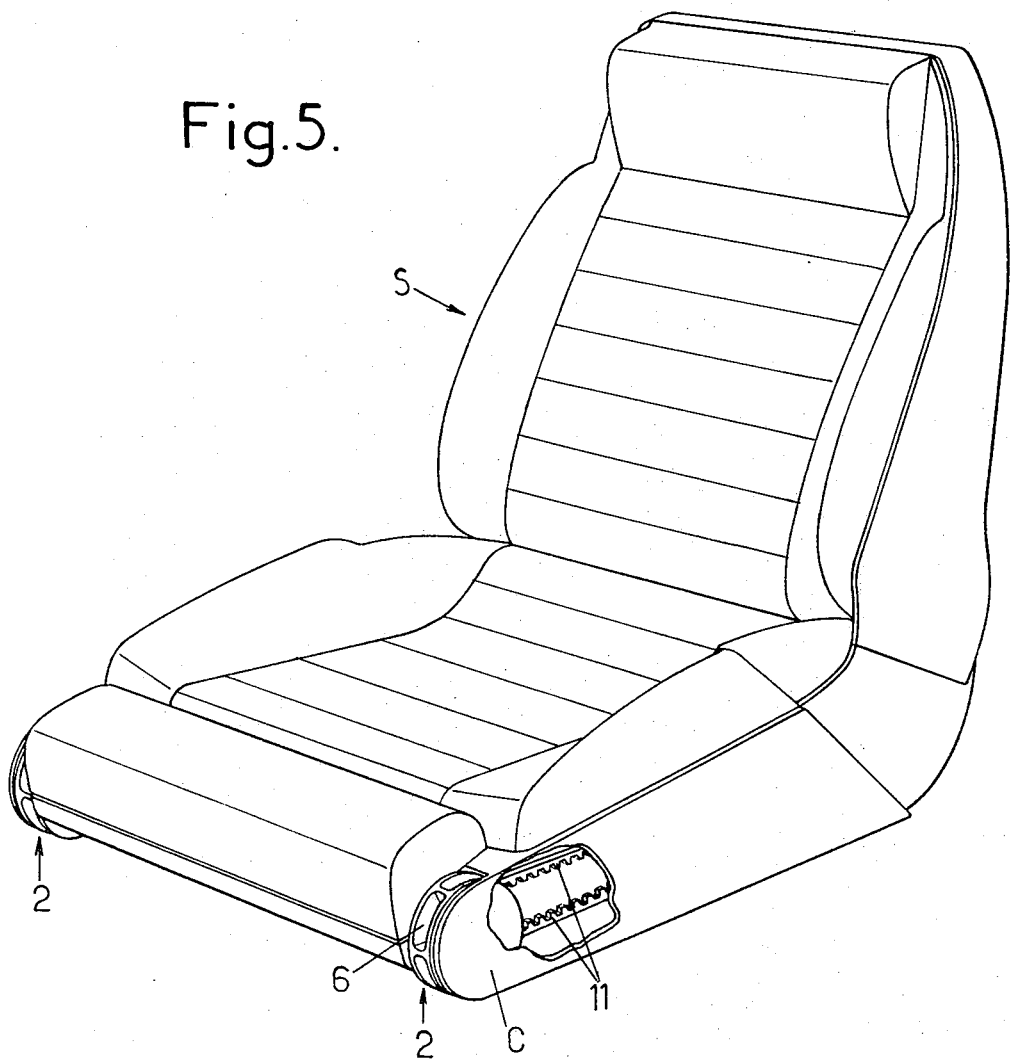
FIG. 5 shows the whole of the seat in perspective.

The vehicle seat S (FIG. 5) considered is fitted with two adjusting mechanisms, one related to the height of the front of the seat and the other the height of the rear of this seat; it is known that two such mechanisms allow, by their combined actions, the height and/or tilt of the whole of the seat to be adjusted at will.

Instead of being disposed on one of the sides of the seat, at the rear thereof or at an intermediate point in its longitudinal dimension, as in known constructions, the control members or handwheels of the two adjusting mechanisms, which are rotatably mounted about transverse shafts, i.e. extending along the width of the seat, are here brought forward, including their axes of rotation, to the front of the seat, or more precisely to the front ends of the two sides thereof, preferably fairly high, rather as if each of these members were fixed at the front end of the arm of an armchair which is not very high.

This arrangement presents several advantages and in particular the following.

The handwheels in question are much more easily accessible for the hands of the user of the seat than the control members of known mechanisms. It is known that, considering the position of these known members, generally fairly low and fairly rearwards of the seat, their operation requires veritable contortions on the part of the user, so that this latter often prefers to make do with a badly adjusted seat rather than try to correct the position of his seat through such an operation: in the present case, on the contrary, by simply resting his arms along his body the seated user brings quite naturally his hands into said position on said handwheels.

Furthermore, and especially, the transfer in question of the handwheels to the front of the seat frees the sitting portion of this seat laterally and so allows this latter to be placed in a substantially jointing way in a rigid trough forming part of the resistant structure of the vehicle, said sitting portion then being able to be arranged so that it contributes by itself to the transverse resistance of the vehicle to crushing.

In the preferred embodiment illustrated, the two control handwheels 1 and 2 are formed by "pancakes" 3 having the same transverse axis X and extended radially in a star shape by lugs 4, the whole of the starred "pancake" having a relatively large diameter, preferably between 10 and 15 cm. Thus each "pancake" is a core structure having the form of an axially thick, somewhat star-shaped disc.

These lugs are furthermore contained between two circular lateral discs 5 which define therewith sockets 6 adapted to receive the fingers of the user (generally thumb and forefinger).

Connecting fillets 7 are preferably provided between these different elements (pancakes, lugs and discs) and at the level of their edges so as to make the feel of the handwheels pleasant to the fingers and in particular the feel of the bottoms of the sockets.

The control rotations of the handwheels thus defined are essentially caused by passing one lug 4 from its upper position to its front position by pushing it or by passing it in the inverse direction by pulling on this lug: a single finger (thumb or forefinger) of the hand which then practically covers the handwheel is sufficient for providing said push or said pull. It is not a question here of grasping a handle and gripping said handle, which would require space at the end of the shaft: in the present case, the handwheel may even be let into a cover C (FIG. 5) leaving accessible from the outside only its front upper quadrant angularly extended by two surfaces of the order of 30° to 45° respectively at the front towards the bottom and at the top towards the rear.

Each of the height adjustments properly speaking is provided from rotations of a rigid bar having a transverse axis, i.e. extending along the width of the seat, this bar being designated by the reference 8 for the front mechanism and by the reference 9 for the rear mechanism.

The rotations of each control handwheel 1, 2 are transmitted to the corresponding bar 8, 9 by means of a remote transmission system.

This system comprises preferably chains or notched belts (10 for the front control, 11 for the rear control) adapted to cooperate with wheels which are toothed or notched correspondingly and which are respectively integral with the handwheels sprockets 1 and 2 (front wheels 12, 13) and with the bars 8 and 9 (respectively intermediate wheel sprocket 14 and rear wheel sprocket 15).

The ratio between the number of teeth of the two front wheels (12, 13) and that of the other two wheels (14, 15) is advantageously 2 to 1 so that movement through an angle a of a handwheel causes a movement through an angle 2a of the corresponding bar.

Particularly, a rotation of 90° of a handwheel causes a rotation of 180° of the associated bar, which is particularly advantageous, as will be seen further on, for the preferred illustrated embodiment.

For this reason, the number of lugs 4 of each handwheel is preferably equal to four, each operation corresponding to an angular movement of a handwheel equal to 90° or to a multiple of 90° and said handwheel then assuming, after each operation, an angular position in which it always presents its lugs 4 at the same radial positions.

There will be described first of all, in what follows, the mechanism for adjusting the height of the front end of the seat, this mechanism using the rotations of the front bar 8, which are here controlled by the rotations of the left-hand handwheel 1.

Bar 8 supports at each of its two axial ends a roller cylindrical in revolution 16 having the same axis Y as this bar and itself supporting two cylindrical eccentric pins 17 having axes parallel to the axis Y and symmetrical to one another with respect to this axis Y.

Each roller is jointingly housed in a horizontally elongated aperture 18, integral with the front end of the framework of the sitting portion of the seat, the end whose height it is desired to adjust.

As for pins 17, they coact with a vertical set of teeth 19 cut out in a longitudinal vertical side-plate 20 forming part of the base 21 of the seat: this set of teeth 19 extends along a substantially vertical arc of a circle centred approximately on the axis Z of the rear bar 9.

The two parallel side-plates 20, just like the whole of the base 21 of the seat with which they are integral, are advantageously fixed in a way known per se on two parallel slides 22 arranged so as to allow longitudinal adjustment of the seat.

Apertures 18 are here cut out in plates 23 which are welded to the ends of a transverse tube 24 forming part of the framework of the sitting portion.

Two helical tension springs 25, each stretched between a lug 26 forming part of base 21 and bar 8, operate to urge pins 17 constantly to the bottom of the notches of the sets of teeth 19. Securing of these springs 24 to bar 8 is effected, through openings 27 of tube 24, so as to make possible rotation of bar 8 about its axis Y.

This bar 8 is advantageously formed by a tube terminating in two solid cylindrical end-pieces fitted into this tube.

Handwheel 1 is mounted loose on shaft 28 with axis X, which is itself mounted in two horizontally elongated apertures 29 of base 21.

Finally a link 30, through which passes jointingly at both its ends shaft 28 and a bearing surface of revolution of bar 8, maintains the spacing between axes X and Y constant while allowing horizontal movements of the unit.

The operation of the mechanism thus described is the following.

At rest, the two pins 17 of each of the two pancakes 16 are firmly introduced to the bottom of two notches of the corresponding sets of teeth 19 by the pull of springs 28.

The end of the sitting portion then rests at a well-defined height on base 21 by means of the edges of its apertures 18, rollers 16, pins 17 and the teeth with horizontal sides, of the sets of teeth 19, meshing with these pins 17.

Bar 8 is itself in its most advanced position; because of the existence of link 30, the same goes for handwheel 1.

To modify the height of the front end of the sitting portion, it is sufficient to rotate handwheel 1.

During the first part of this rotation bar 8, itself rotated through wheel 12, chain 10 and wheel 14, begins by pivoting about the two pins 17 situated respectively on both sides of the seat and materializing a swivelling axis, whereas the other two pins 17 are disengaged from their notches by causing the assembly of bar 8 and handwheel 1 to move back slightly along the corresponding elongated apertures 18 and 29 (only the left-hand aperture of the seat when looking forwards thereof being considered for this operation).

At the same time, springs 25 stretch out.

From the moment when each released pin 17 has reached the same level as its partner on the same roller, it again gradually approaches the corresponding set of teeth to finally engage in the notch situated immediately above or below that permanently occupied by its said partner forming a swivel: this approach is ensured automatically by the resilient pull of springs 25.

At the end of this engagement, the mechanism is in a new stable condition corresponding to an adjustment in height of the front of the sitting portion different from the preceding one.

Between two such successive stable conditions of adjustment, each roller 16 rotates through 180° and handwheel 1 through 90°.

Of course, to ensure the desired height adjustment, handwheel 1 may be caused to rotate through 90° only or else through a multiple of this angle, and this in one or the other direction depending on whether one desires to raise or on the contrary to lower the front end considered.

The height adjustment of the rear end of the sitting portion makes use in an entirely similar way of the angular movements of the rear bar 9, which are controlled by the rotations of the righthand handwheel 2, these rotations being transmitted to this bar 9 by wheel 13, chain 11 and wheel 15.

As previously, we find again in this rear mechanism rollers 31 with pins 32 mounted on the ends of bar 9 and adapted to coact respectively with horizontally elongated apertures 33 and with substantially vertical sets of teeth 34.

But though the sets of teeth 34 are still cut out in the side-plates 20 of the base, the apertures 33 are here cut out in rocking levers 35, themselves pivotably mounted on studs or swivels 36 welded to side-plates 20.

These rocking levers are cross-braced by means of a tube 37 forming part of the framework of the sitting portion, this tube being fixed to said rocking levers and containing bar 9.

The return of pins 32 to the bottom of the notches or the sets of teeth 34 is provided by helical tension springs 38 stretched between lugs 39 integral with the rocking levers and bar 9 itself, whereby these springs pass through openings 40 in tube 37.

The axis Z of bar 9 is connected mechanically to the one X of shaft 28 of handwheel 2 by means of a rigid link 41.

The sets of teeth 34 are here centred on the common axis W of studs 36, which axis is disposed in front of these sets of teeth, for example at a distance therefrom of about 7 cm, in the middle of their height.

This rocking lever assembly presents the following advantages:

it ensures a permanent rigid mechanical connection along the longitudinal direction of the seat between the sitting portion and the base of this seat, and this whatever the position of bars 8 and 9, it allows a rising thrust to be very simply applied to the rear of the seat with a view to compensating for the weight of the person sitting in this seat: it is sufficient for this purpose to secure at least one strong helical tension spring 42 extending in a substantially horizontal direction between a point 43 on side-plate 20 and a high point 44 on one of the two rocking levers 35.

In the embodiment illustrated, which comprises two handwheels situated respectively on both sides of the seat, the control of one of the two mechanisms by rotation of one of these handwheels causes a slight backward movement of this latter whereas the other handwheel remains in place: this isolated backward movement causes a slight tilt of axis X with respect to the transverse direction of the seat, but this tilt is not perceptible in practice considering that the amplitude of said backward movement is very small, being generally less than 1 cm and for example of the order of 3 mm whereas the axial spacing between the two apertures 29 which support shaft 28 is of the order of 50 cm.

So as to avoid any axial disengagement between pins 17, 32 and the corresponding sets of teeth 19, 34, it is advantageous to cover these pins at their ends opposite the corresponding rollers 16, 31 with a cylindrical cap 45, 46 (FIG. 4) having the same section as said roller so that the sets of teeth are then imprisoned axially between these rollers and these caps. For each bar, one of these caps forms the hub of the corresponding toothed driving wheel 14, 15.

The sets of teeth 19, 34 form preferably the front edges of relatively narrow vertical apertures 47, 48 cut out in side-plates 20, these apertures being if necessary widened locally (see at 49, FIG. 1) so as to make possible the assembly and disassembly of the bars.

As is evident, and as it follows moreover already from what has gone before, the invention is in no wise limited to those of its modes of application and embodiments which have been more specially considered; it embraces, on the contrary, all variations thereof, particularly:

those where the adjustment provided by a handwheel carried forward to the front of the seat relates to a parameter other than the front or rear height of this seat, particularly the relative tilt of the seat back of this seat or the stiffness of the lumbar support for persons sitting in said seat, those where the different control members carried forward to the front of the seat are all disposed on the same side of this seat instead of being respectively disposed on both sides thereof, these members being then mounted preferably so that they are coaxial at rest and so that from this position they may be moved longitudinally a few millimeters rearwards of the seat independently of each other, those where the remote transmissions of the rotations of handwheels 1 and 2 are provided by elements other than chains or notched belts, for example by means of perforated bands coacting with toothed wheels in correspondence, or else by means of flexible-torque transfer cables, or even by means of chains of electric elements comprising a synchronized motor and driven portion, those where the desired controls are provided, in any appropriate way, by means of rotatable bars having fixed transverse axes and not horizontally mobile as in the embodiments described above.

I claim:

1. An adjustable vehicle seat, comprising:

a base including means for mounting the base to a vehicle;

a sitting portion and a seat back carried on said base by a mechanism including means for reversably adjusting at least part of at least one of the sitting portion and seat back relative to at least another of the seat back, the sitting portion and the base to provide at least a first adjustment, of which each adjustment has two opposite extremes;

said sitting portion having a front end and two opposite sides extending to said front end;

said mechanism means including a system of mechanical linkages including a first bar located with its own longitudinal axis disposed horizontally, transversely of the vehicle seat near said front end of said sitting portion and so as to have an end thereof accessible at one of said sides of said sitting portion;

a rotatable control member mounted on said end of said bar, beside said sitting portion adjacent the front end of said sitting portion and rotatably incorporated in said system of mechanical linkages;

said system of mechanical linkages being constructed and arranged so that rotation of said control member about said transverse axis in one angular sense produces said first adjustment toward one extreme thereof; and rotation of said bar about said transverse axis in an opposite angular sense produces said first adjustment to the opposite extreme thereof.

2. The adjustable vehicle seat of claim 1, wherein:

said rotatable control member is constituted by an axially relatively thick core disk which is generally axially star shaped in that it includes a plurality of radially projecting angularly spaced lugs interspersed with respective radially outwardly opening angularly spaced user's finger-receiving recesses; and a pair of axially opposite end disks which sandwich between them said core disk and provide axially opposite end walls for said recesses.

3. The adjustable vehicle seat of claim 2, wherein:

said lugs are four in number, and are spaced equiangularly about the circumference of the core disk.

4. The adjustable vehicle seat of claim 2, further including:

means defining a housing covering said rotatable control member, said housing being generally cylindrical so as to include a generally circumferentially extending radially outer peripheral wall, there being opening means through said cover for user's finger access to said rotable control member in the upper front quadrant of said outer peripheral wall.

5. The adjustable vehicle seat of claim 1, wherein:

said system of mechanical linkages includes:

a transverse horizontal bar journalled for rotation on said vehicle seat and extending substantially the full width of the seat at a site that is remote from said rotatable control member;

a first sprocket means mechanically connected with said rotatable control member for rotation therewith;

a second sprocket member mechanically connected with said transverse horizontal bar for rotation therewith; and and endless drive belt means entrained about both said sprockets so that as the rotatable control member is rotated a corresponding rotational effect is drivingly transmitted to said transverse horizontal bar.

6. The adjustable vehicle seat of claim 5, wherein:

said system of mechanical linkages further includes:

said transverse horizontal bar including two opposite ends each having a cylindrical roller coaxially mounted thereon, each roller having a pair of parallel pins based thereon and extending axially outwardly of the respective roller, the respective pins of each pair both being eccentrically mounted on the respective roller;

a pair of rack gears mounted on said base of said vehicle seat, each rack gear having a series of teeth which extends a substantial vertical distance;

said pins of each pair being disposed in meshing relation with the teeth of a respective said rack gear;

said seating portion including a framework having two opposite sides, each having a means providing a slot therein which is elongated horizontally, longitudinally of the vehicle seat;

each said roller being journalled in a respective said slot;

resilient means mounted to said transverse horizontal bar and distally elsewhere to said vehicle seat for continually pulling said transverse horizontal bar in a sense so as to continually urge said pins into deeply meshing relation with the teeth of the respective said rack gears; and rigid link means effectively extending between said transverse horizontal bar and said first bar for maintaining a constant amount of space between said transverse horizontal bar and said first bar while allowing slight movement of the transverse horizontal bar back and forth longitudinally of the vehicle seat as said pins of each pair are alternatingly drivingly against the respective rack gears by rotation of said rotatable control member.

7. The adjustable vehicle seat of claim 6, wherein:

said means for reversibly adjusting is provided in a like plurality of two, respectively for raising and lowering the front of the seating portion relative to the base and for raising and lowering the rear of the seating portion relative to the base;

the rotatable control member of one of said means for reversibly adjusting being located beside the left side of the sitting portion adjacent the front end of the sitting portion, and the rotatable control member of the other of said means for reversibly adjusting being located beside the right side of the sitting portion adjacent the front end of the sitting portion;

the said slots of one of said means for reversibly adjusting being fixedly provided on said opposite sides of said framework of said seating portion, and the said slots of the other of said means for reversibly adjusting being provided on respective levers respectively rockably pivoted by respective pivots to said opposite sides of said framework of said seating portion at a fixed height relative to said base, which height corresponds to approximately the midpoint of the height of the respective rack gears.

8. The adjustable vehicle seat of claim 7, wherein:
said rocking levers are part of said means for reversibly raising and lowering the rear of said seating portion; and
further comprising:
two relatively strong tension spring means, each stretched substantially horizontally, longitudinally of the vehicle seat between said base, and a respective rocking lever at a site on that lever located substantially above the respective slot and pivot of that lever.

9. The adjustable vehicle seat of claim 7, wherein:
the two rocking levers are constituted by respective plates; and
further comprising:
a rigid transverse tube fixedly connected at opposite ends to said plates.

10. The adjustable vehicle seat of claim 9, wherein:
said horizontal transverse bar of said means for reversibly raising and lowering the rear of the seating portion passes axially through said rigid transverse tube.

* * * * *